(No Model.) 11 Sheets—Sheet 1.
R. W. BATEMAN.
BOOT NAILING MACHINE.

No. 507,472. Patented Oct. 24, 1893.

Witnesses.
J. Brierley Howard
Charles Ainley

Inventor.
Richard Wilkinson Bateman (No Model.)  
11 Sheets—Sheet 2.

R. W. BATEMAN.
BOOT NAILING MACHINE.

No. 507,472. Patented Oct. 24, 1893.

Witnesses.  
J. Brierley Howard  
Charles Ainley

Inventor:  
Richard Wilkinson Bateman (No Model.) 11 Sheets—Sheet 3.

R. W. BATEMAN.
BOOT NAILING MACHINE.

No. 507,472. Patented Oct. 24, 1893.

Witnesses.
J. Brierley Ward
Charles Ainley

Inventor:
Richard Wilkinson Bateman

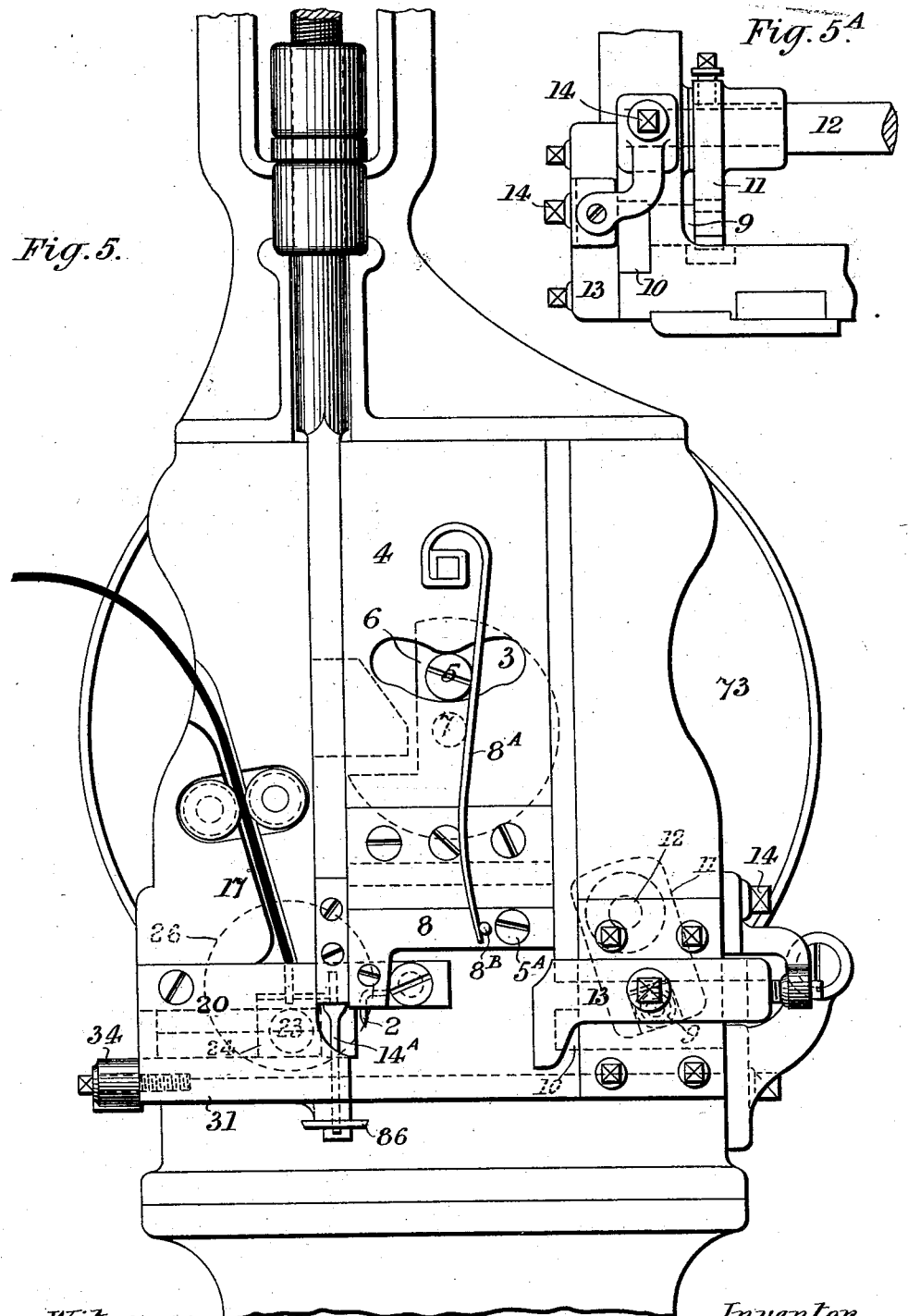

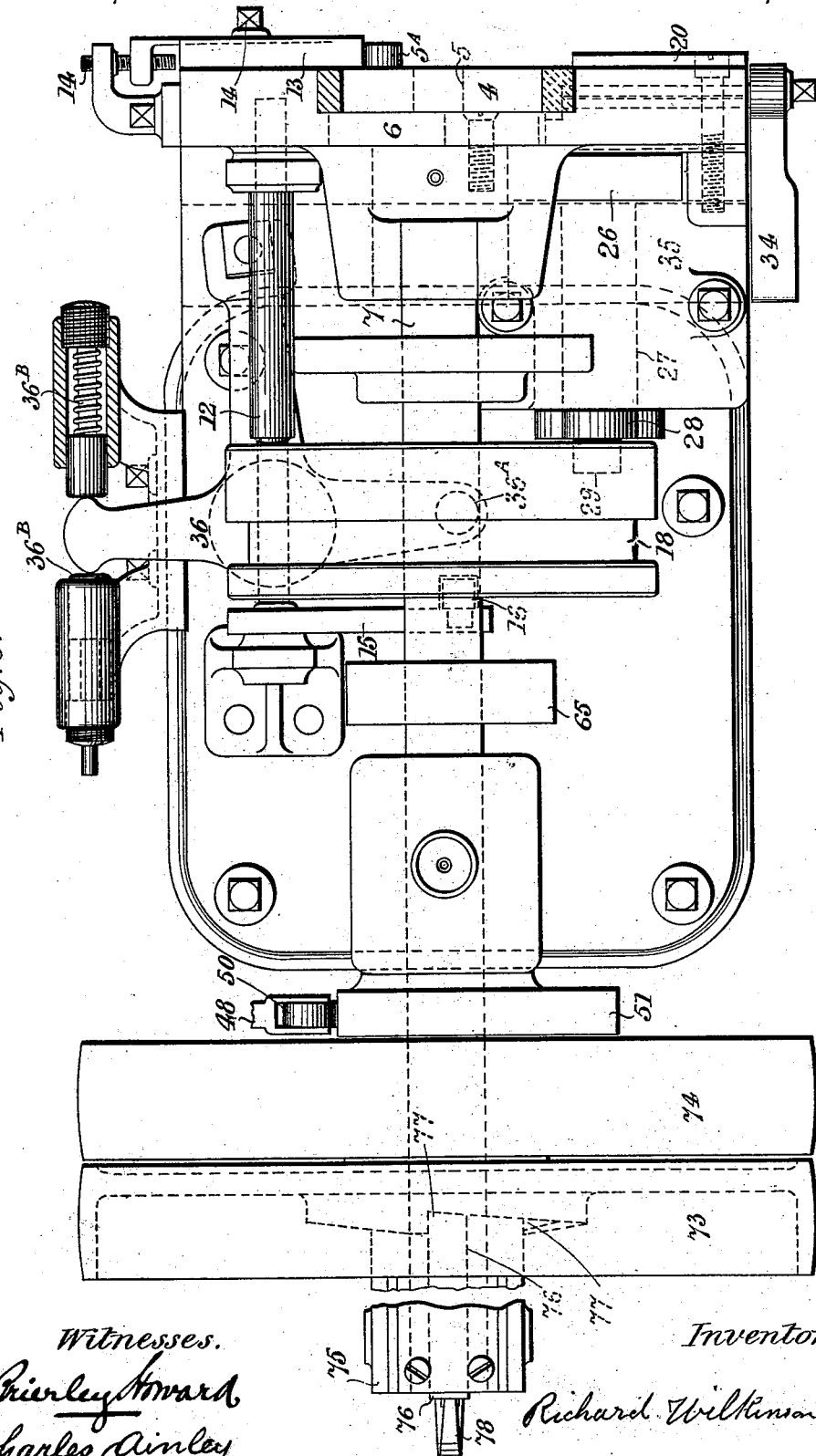

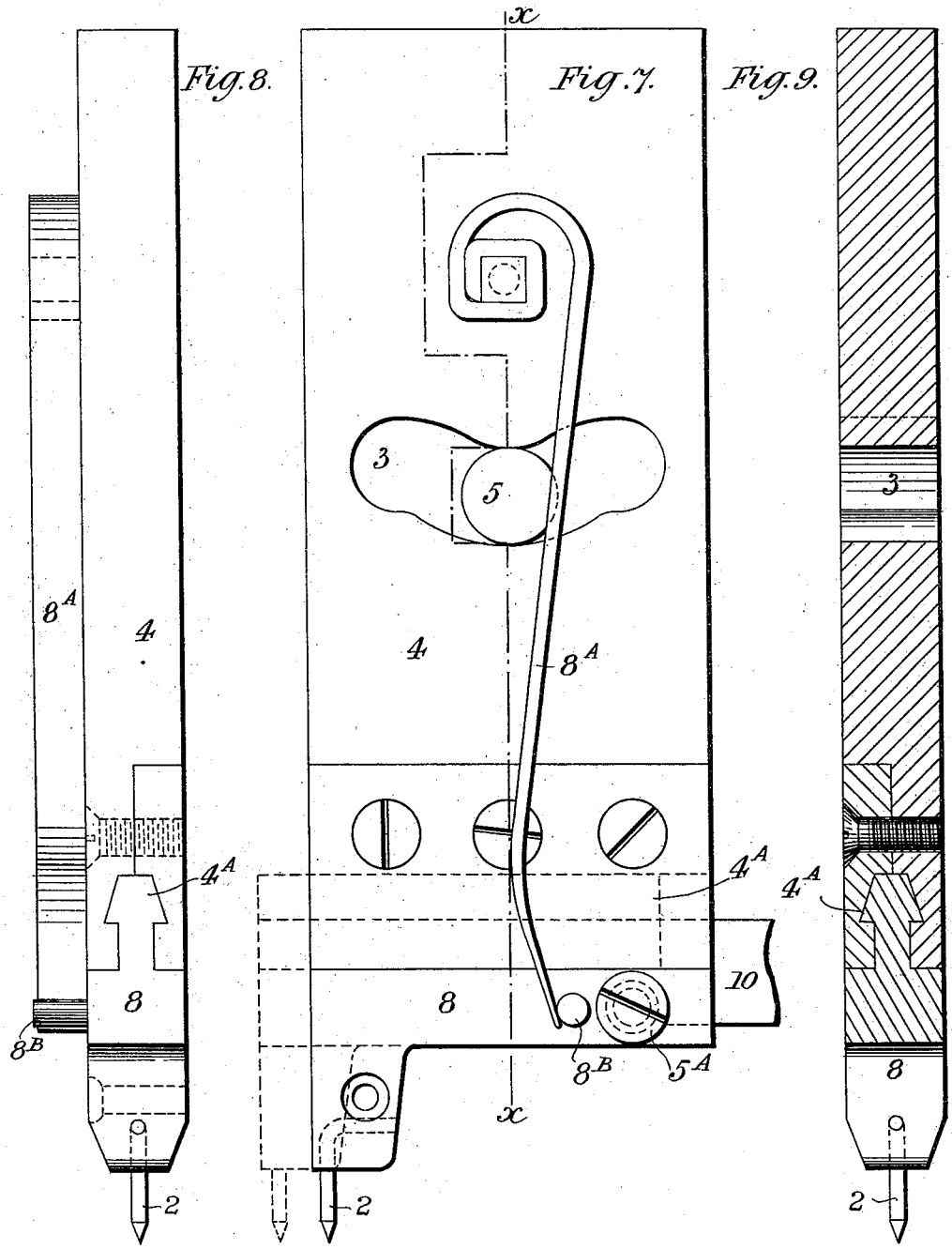

(No Model.)  
11 Sheets—Sheet 7.
R. W. BATEMAN.
BOOT NAILING MACHINE.
No. 507,472.  
Patented Oct. 24, 1893.
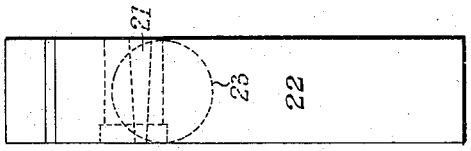
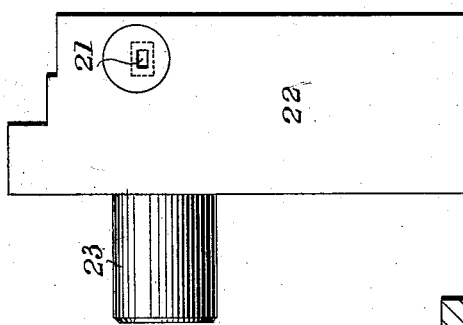
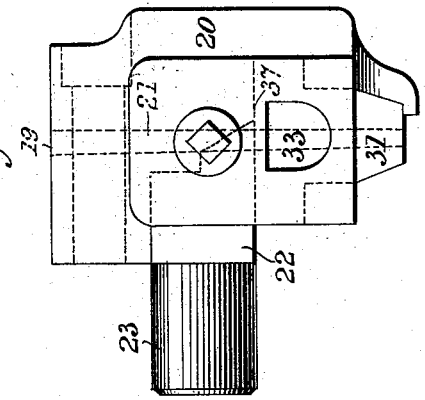
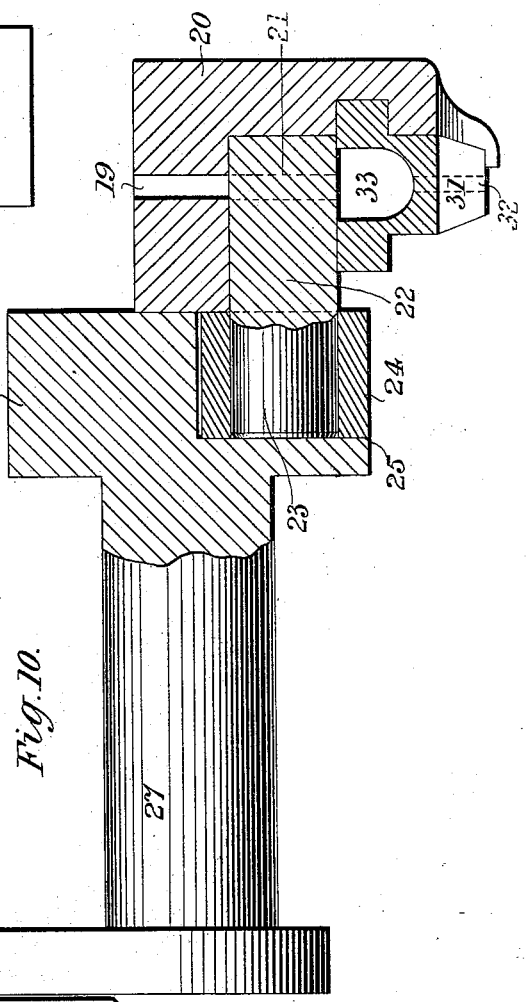
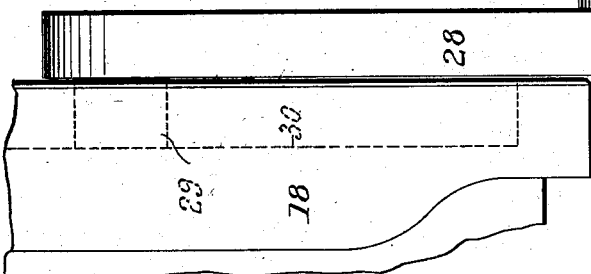
Witnesses.  
J. Bierley Howard  
Charles Ainley
Inventor.  
Richard Wilkinson Bateman

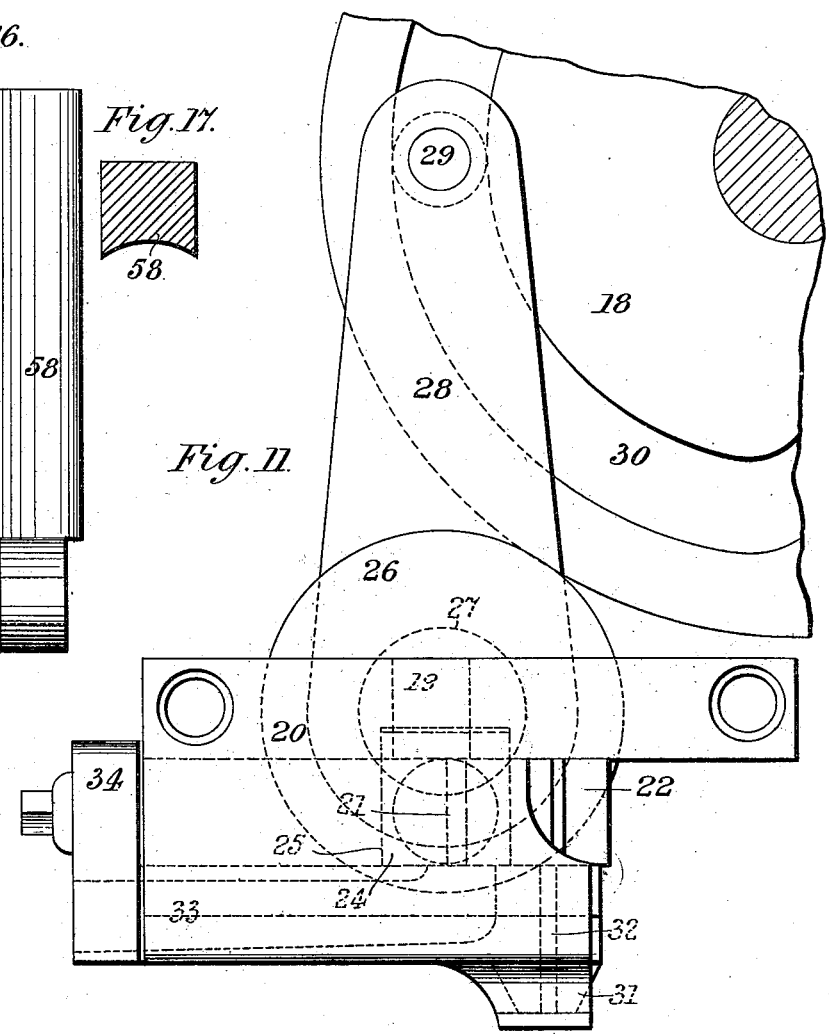

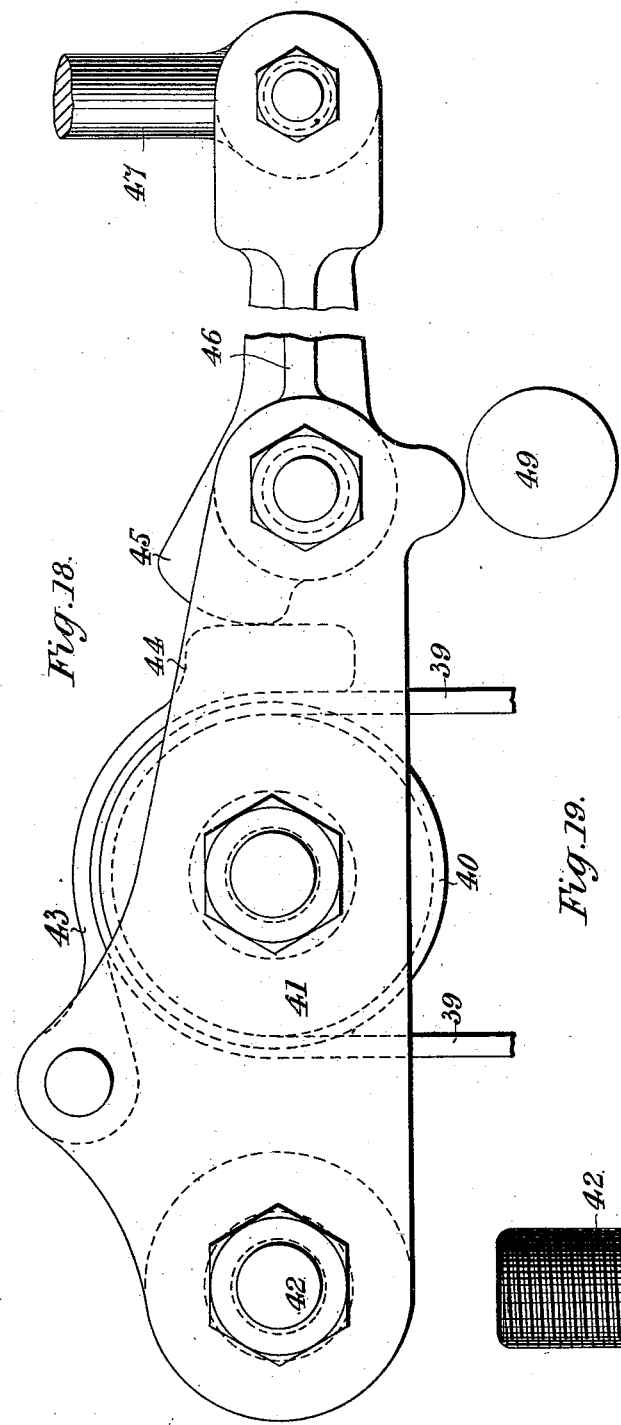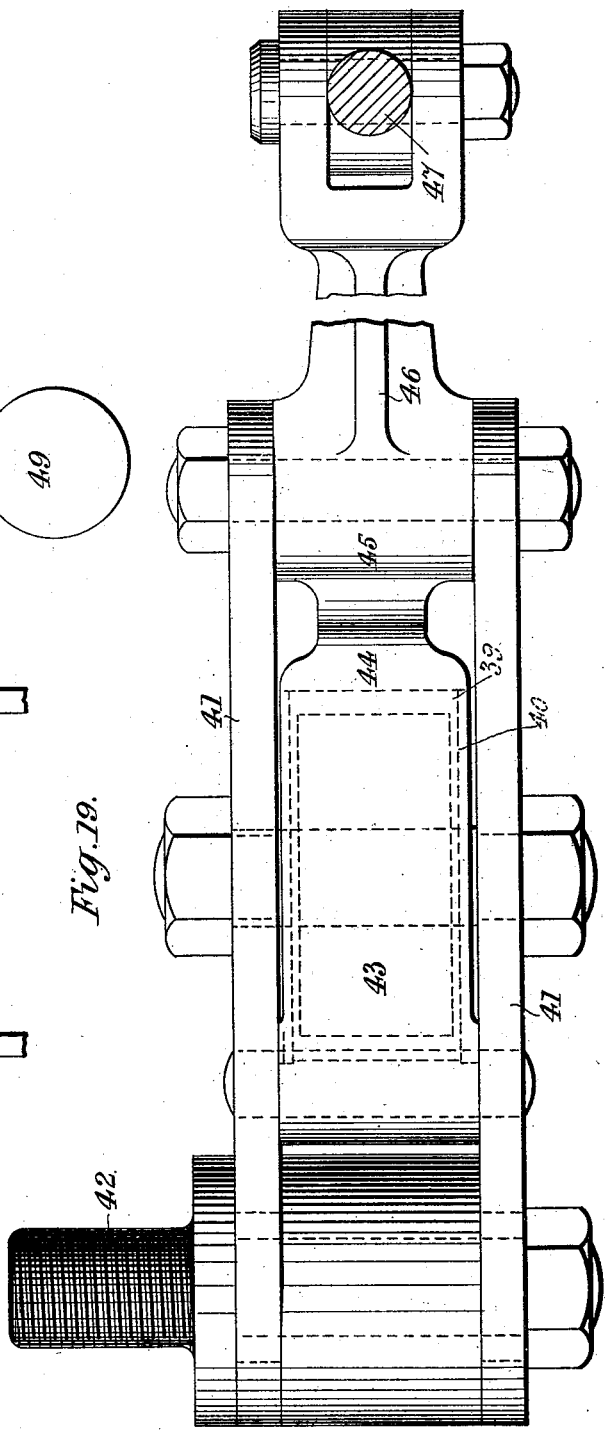

(No Model.) 11 Sheets—Sheet 10.
R. W. BATEMAN.
BOOT NAILING MACHINE.
No. 507,472. Patented Oct. 24, 1893.
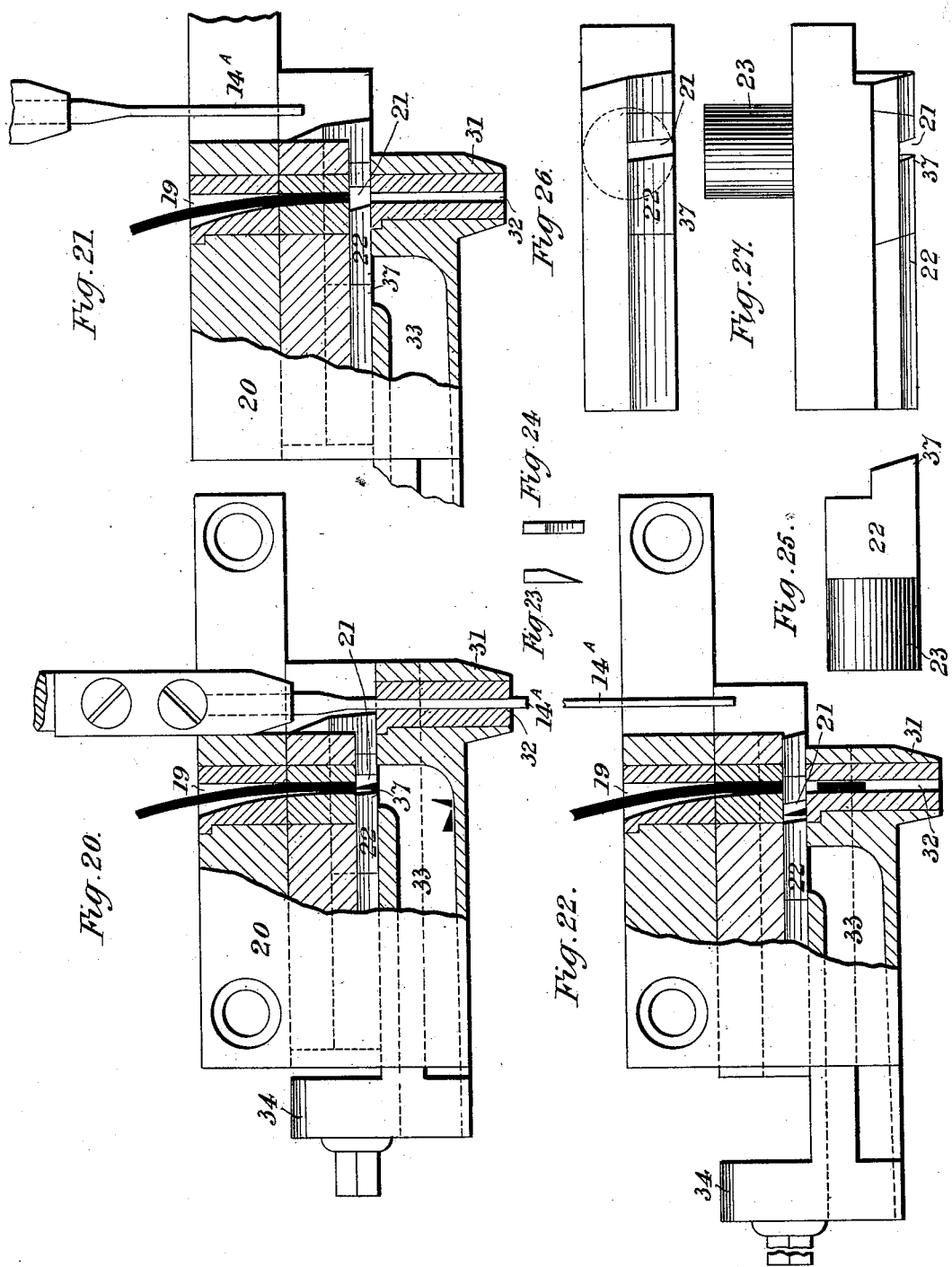
Witnesses.
Inventor:
Richard Wilkinson Bateman (No Model.) 11 Sheets—Sheet 11.
R. W. BATEMAN.
BOOT NAILING MACHINE.
No. 507,472. Patented Oct. 24, 1893.
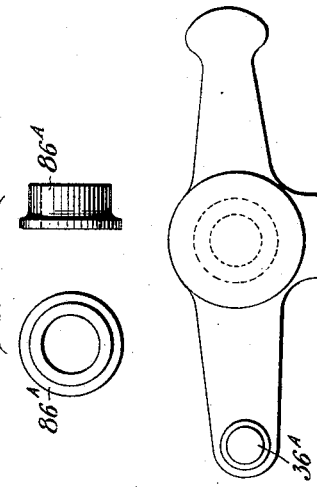
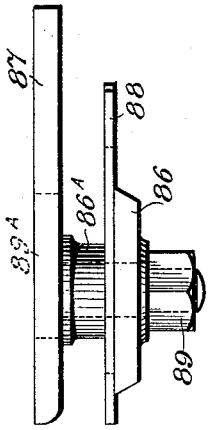
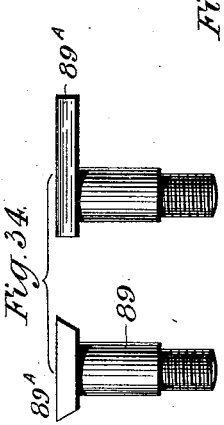
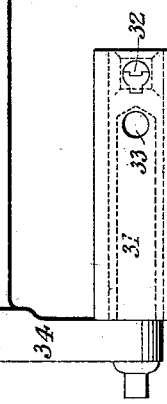
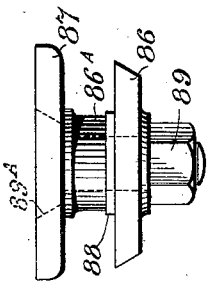
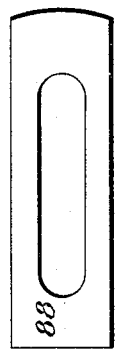
Witnesses. Inventor.
Richard Wilkinson Bateman

UNITED STATES PATENT OFFICE.

RICHARD WILKINSON BATEMAN, OF HALIFAX, ENGLAND.

BOOT-NAILING MACHINE.

SPECIFICATION forming part of Letters Patent No. 507,472, dated October 24, 1893.

Application filed June 8, 1893. Serial No. 476,942. (No model.)

*To all whom it may concern:*

Be it known that I, RICHARD WILKINSON BATEMAN, a subject of Her Majesty the Queen of Great Britain, residing at Halifax, in the county of York, England, have invented a certain new and useful Improvement in Boot-Nailing Machines, of which the following is a specification.

My invention relates to improvements in boot nailing machines which includes sprigging and pegging machines, the apparatus being adapted to work with wire from a continuous roll which is cut off into nails or sprigs or with a continuous length of wood prepared for the purpose all as well understood.

The improvements in question are directed more particularly to the means for operating the pricker to the cutting or pointing of the nails or sprigs and to the operating and adjusting of the "horn" on which the boot or shoe is held while it is being worked on, the means employed for this latter purpose enabling the powerful spiral spring heretofore employed on the vertical spindle of the horn to be dispensed with so that the objectionable marking of the surface of the sole is avoided.

Figure 1:
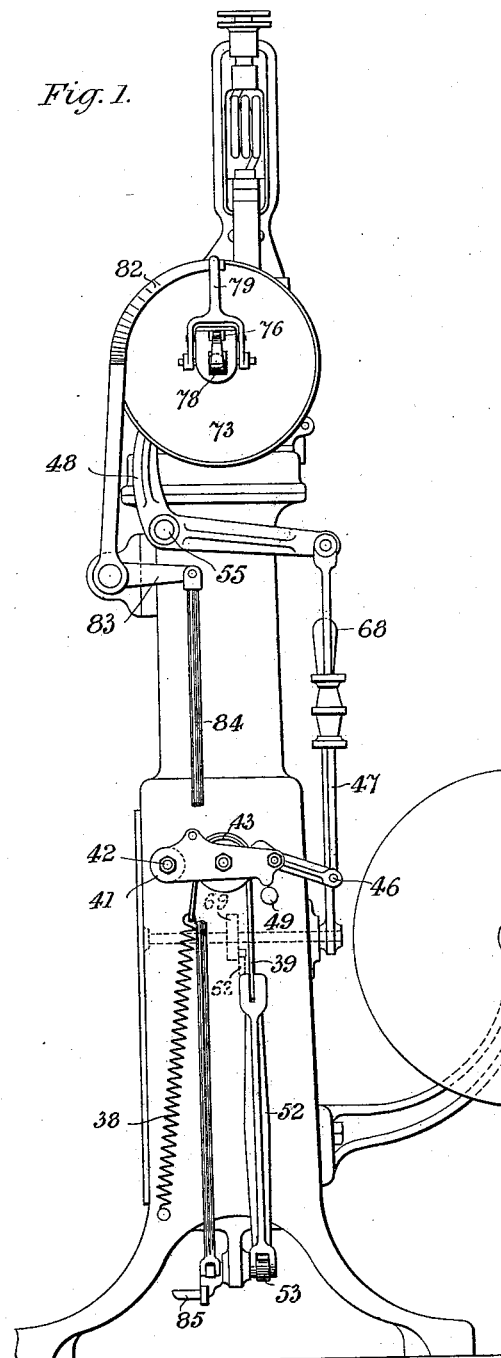
Figure 2:
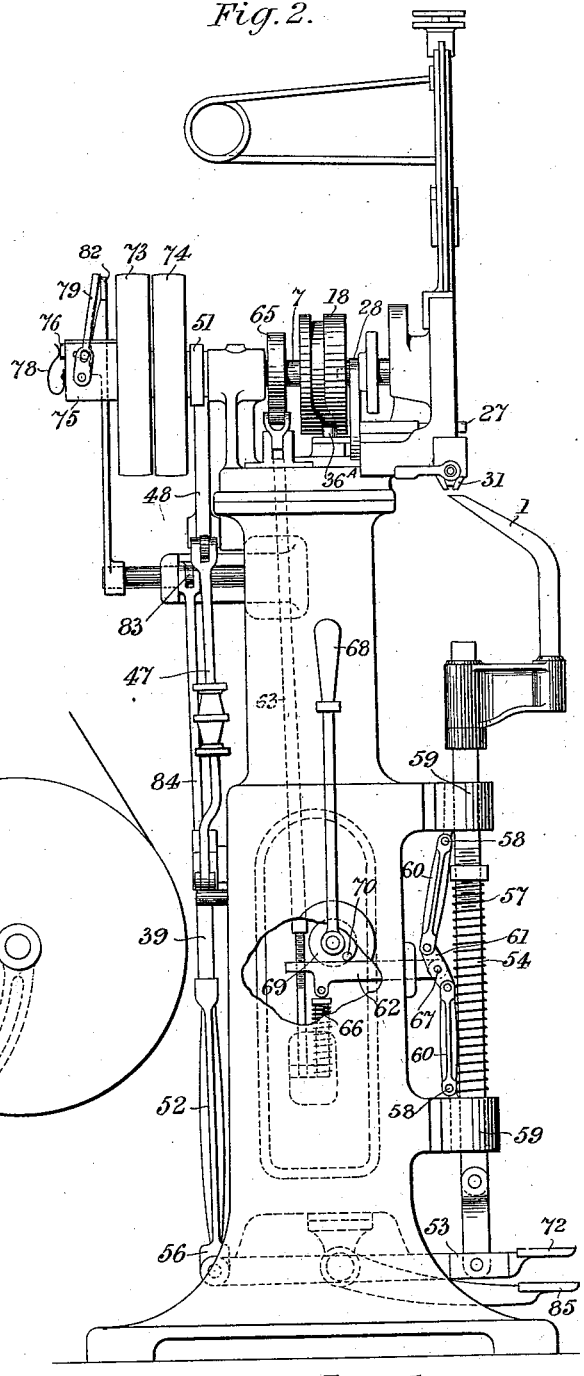
Figure 35:
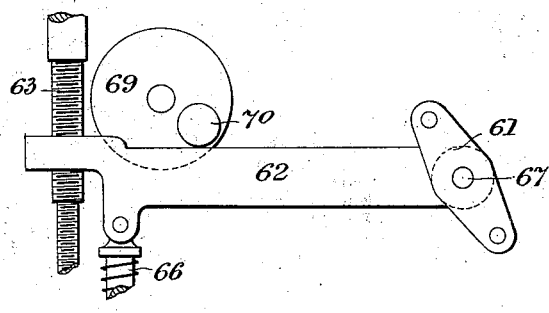
Figure 3:
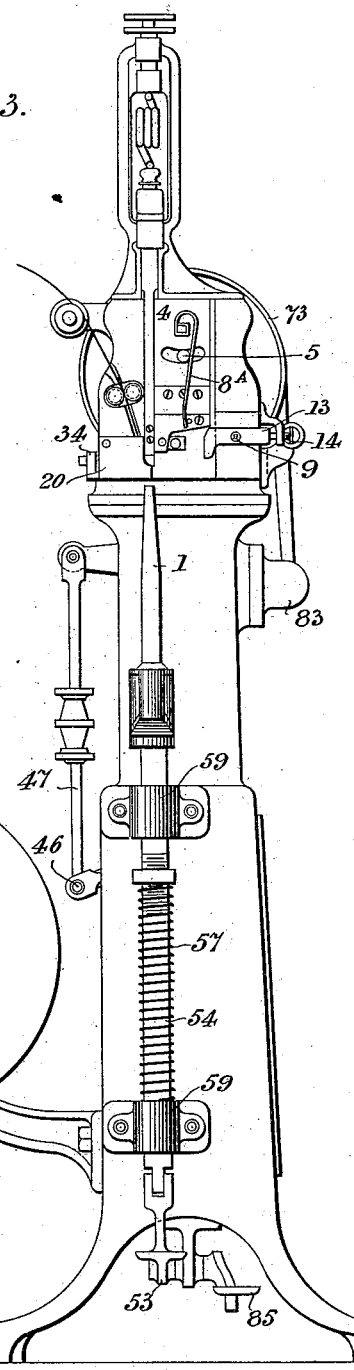
Figure 4:
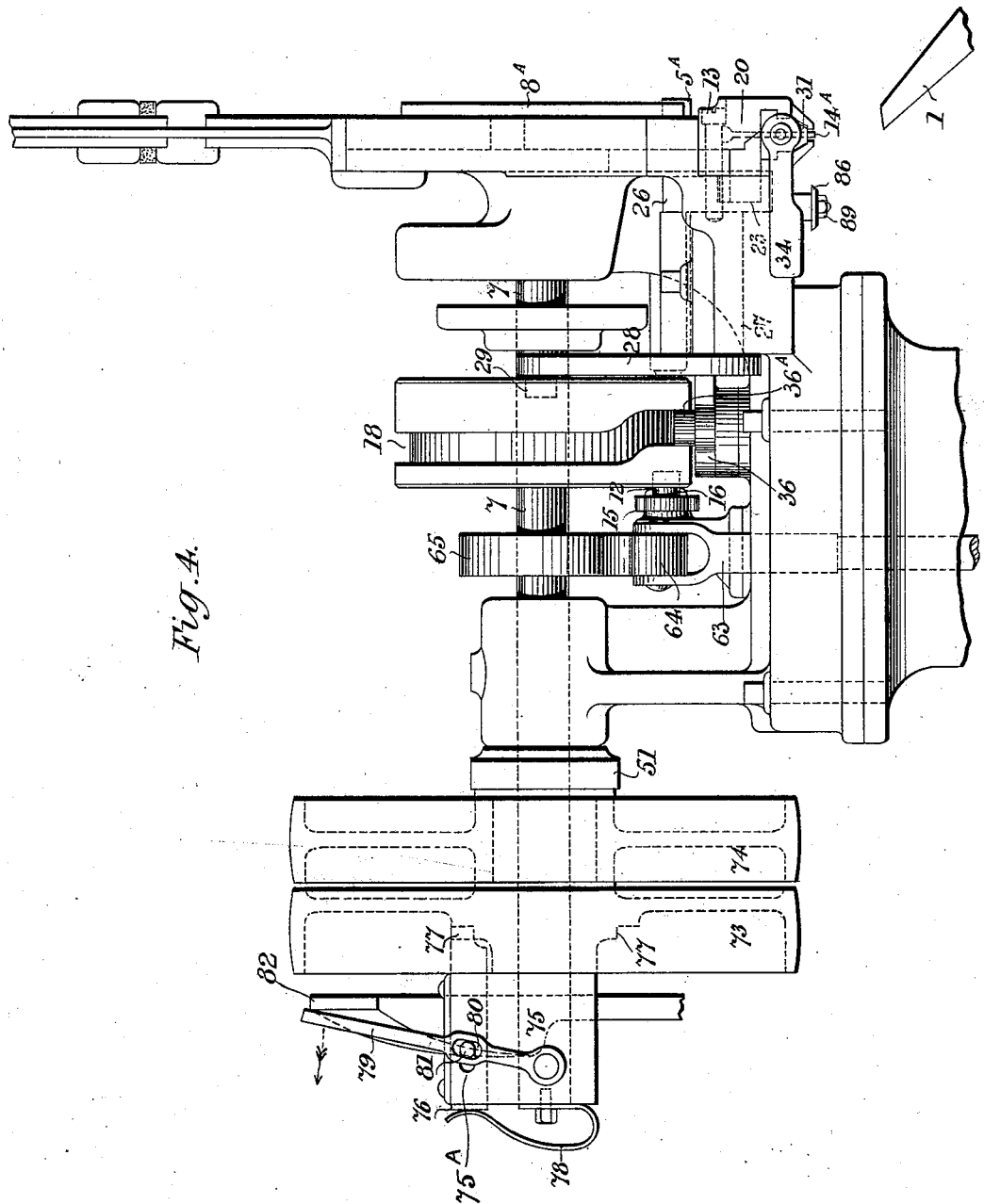

Referring to the accompanying drawings—Figure 1 is a back view of the improved nailing, sprigging and pegging machine. Fig. 2 is a side elevation of Fig. 1. Fig. 3 is a front elevation of the improved machine. Fig. 4 is a side elevation of the head of the machine drawn to an enlarged scale. Fig. 5 is a front elevation of Fig. 4 with the front plate or cover removed. Fig. 5ª is an end view of a part of Fig. 5. Fig. 6 is a plan view of Fig. 4. Fig. 7 is a front elevation of slide piece, pricker carrier and pricker, on a further enlarged scale. Fig. 8 is an end elevation of Fig. 7. Fig. 9 is a section of Fig. 7 on line *x—x*. Fig. 10 is an end or side view partly in section, of the sprig or nail cutting, or shearing device. Fig. 11 is a front view of Fig. 10. Fig. 12 is a side elevation of the shear box, shear block and nail carrier the shear block being of a different shape to that shown in Fig. 10. Fig. 13 is a front view of Fig. 12. Figs. 14 and 15 are plan and front views of a shear block or die (for cutting or shearing straight nails or slugs) such as shown in Figs. 10 and 11. Fig. 16 is a side view and face view respectively of a wedge block for folding the horn spindle. Fig. 17 is a section of same. Fig. 18 is a view in elevation of part of the apparatus for adjusting the horn or insuring its adapting itself to various thicknesses of soles. Fig. 19 is a plan view of Fig. 17. Fig. 20 is a front elevation of the shear box, die or shear block, and nail carrier and plunger partly in section showing their relative positions when the nail is being driven by the plunger and the waste carried to the trough. It corresponds to Figs. 12 and 13. Fig. 21 is a similar view to Fig. 20 but showing the several parts in the position for the forward or "feed" movement of the wire from which the nail is to be cut. Fig. 22 is a similar view to Fig. 21 but the shear block or die has been moved slightly cutting the nail off the length of wire and holding the waste piece until the forward movement of the nail carrier takes the nail under the plunger, and the waste drops into the waste trough. Figs. 23 and 24 are side and front views of a pointed nail or sprig such as produced by the operation of Figs. 12 and 20. Figs. 25, 26 and 27 are end, front and plan views of the die detached for producing the sprigs as aforesaid. Fig. 28 is a plan view of the mechanism for reciprocating the nail carrier. Fig. 29 is a front view of the boot guide detached. Fig. 30 is a side view of same with the addition of a further guide plate. Fig. 31 is a plan of this further guide plate detached. Fig. 32 is a plan and side elevation of the guide. Fig. 33 is a plan and side view of the spacing ring employed for the guide to enable same to rotate. Fig. 34 is a front and side view of the pin for holding the guide, and Fig. 35 is a detail of a part of the wedge operating mechanism Fig. 2.

According to this invention the boot or shoe is held in position on the horn 1 and the pricker 2 (see Figs. 5, 7, 8 and 9) is caused to descend and pierce the sole carried on the horn 1 ready for the reception of the nail, sprig, peg or slug through the action of a cam slot 3 cut in the slide piece 4 the latter being worked by means of the crank pin 5 received in the said cam slot 3. The crank pin 5 is mounted eccentrically in the disk or plate 6 (see Figs. 5 and 6) fixed on the main shaft 7 of the machine. When the pricker 2 has pierced the sole and while still in the leather, said pricker is carried forward, and moves the boot or shoe with it by means of the slide piece 8 (in which the pricker 2 is fixed) which slides horizontally in a dovetailed groove 4$^a$ in the vertical slide 4 to the position shown by dotted lines in Fig. 7 being operated by means of the pin or stud 9 fixed in the supplementary slide piece 10 (Fig. 5$^a$) said pin or stud 9 being operated by the slotted lever 11 mounted on the side shaft 12 which is operated by the lever 15 (Figs. 4 and 6) on the end of which is the friction roller 16 working in a cam groove in the face of the cam 18. (See Fig. 6.)

In front of the supplementary slide piece 10 is a block or guide 13 (Figs. 5, 5$^a$ and 6) which can be adjusted and fixed in position by means of the set screws 14, 14. When the slide piece 4 is depressed (it is shown raised in Fig 5) by the action of the crank pin 5 the friction roller 5$^a$ on the slide piece 8 comes in contact with the cam end of the fixed block or guide 13 so that the said slide piece 8 and the pricker 2 are moved to the left or toward the plunger 14$^a$ (see Fig. 5) and the downward motion of the slide piece 4 being continued the pricker 2 is inserted into the sole and while the pricker 2 is still in the sole the side shaft 12 is operated by the lever 15 and the slotted lever 11 moves forward the supplementary slide 10, the end of which now comes in contact with the slide piece 8 and moves the same forward carrying with it the pricker 2 (see Fig. 7) and boot or shoe under operation. When the side shaft 12 has made its full movement the pricker 2 will have moved directly under the plunger 14$^a$ (which is shown down in Fig. 5) whereupon the crank pin 5 by means of the cam slot 3 will withdraw the pricker 2 from the sole and the slide piece 8 is returned to its normal position by the blade spring 8$^a$ (Figs. 7 and 8) pressing on the pin 8$^B$ and the vertical slide 4 and slide 8 are then in the position shown by Fig. 5. A nail sprig, or rivet is now to be inserted in the hole formed by the pricker 2 and this is accomplished as follows: A continuous length of wire is by any of the well known "feed" arrangements fed along the channel 17 through the hole 19 Figs. 10 and 20 in the shear box 20 which is stationary and through the hole 21 in the shear block 22 the hole 21 being brought at the required time into line with the hole 19 by the shear 22 having an intermittent sliding motion imparted to it by means of the shed 23 which is received in the square block or nut 24, the latter being carried eccentrically in a recess 25 (see Fig. 10) in the disk 26 the shaft 27 of which is carried in a pedestal, or in the frame of the machine. An oscillating motion is imparted to the shaft 27 by the lever 28 on the end of which is a friction roller 29 in a cam groove 30 in the face of the cam 18. Below the shear or die 22 is a nail carrier 31 in which is a hole 32 and a trough or channel 33. The said nail carrier 31 has a sliding to and fro motion imparted to it by means of the connecting piece 34, (Fig. 28,) slide bar 35, and cranked or L lever 36 (Fig. 6) on one end of which is a friction roller 36$^a$ controlled by the cam groove in the periphery of the cam disk 18 the other end being elastically held between cushioning springs 36$^B$ suitably carried in a bracket as shown in Fig. 6. When the holes 19, 21 and 32 are brought into line by the cams the wire from which the nails or sprigs are to be formed is fed through such holes, and the length, or that part which extends into the hole 32 (see Fig. 21) is the part which forms the nail or sprig. The shear or die 22 is now by the action of its cam groove 30 moved laterally and the piece of wire in the hole 32 is cut or sheared off and a nail or sprig formed and carried in the hole 32 by the nail carrier 31 until said hole 32 and nail or sprig are directly under the plunger 14$^a$ and over the hole last formed by the pricker 2 in the sole. The plunger 14$^a$ is now forced down by any of the ordinary methods for working such instruments and drives the nail or sprig home in the sole after which the plunger 14 ascends and the pricker 2 enters the sole as hereinbefore described and again moves the boot or shoe forward and leaves the hole under the plunger 14$^a$ ready for another nail or sprig to be inserted. When slugs are being inserted into the hole a straight or plain shear or die 22 is employed and the hole 19 in the shear box 20 is made in the shape of a long slot (Figs. 10 and 11) so that the wire can move with the shear block 22 and is not cut in more than one place, and no waste is carried, or no nail or slug formed which is not driven into the sole.

When sprigs or sharp pointed nails are to be made I substitute for the straight shear 22 a die 37 (Figs. 12, 13, 20, 21, 22, 25, 26 and 27) and this die cuts off a triangular piece and heads the nail formed from the end of the wire when in the position shown in Figs. 21 and 22 and the triangular piece which is waste falls into the trough 33 and so passes out the nail or sprig being sheared off between the shear or die 22 and the hole 19 so that a straight head is formed on the sprig, the end of the wire being left pointed for the next nail.

For the purpose of insuring the horn 1 adapting itself to various thicknesses of soles and welts a weight or spring 38 (Fig. 1) is attached to a strap of leather 39 and the said strap of leather 39 passes over the pulley 40 (see Figs. 18 and 19) carried in an arm or fork 41 free to move on a fulcrum stud 42 fixed in the frame of the machine.

Mounted in the arm or fork 41 is a curved flexible finger 43 at the end of which is a block 44 resting on the strap 39. A tappet 45 is also mounted in the arm or fork 41 and is by link 46 connected to the vertical rod 47 at the upper end of which is the cranked lever 48 (Figs. 1, 2 and 3) in the end of which is carried the runner 50 which rests against the cam 51 on the main shaft 7 (Fig. 6). One end of the strap 39 is attached to the link 52 connected to one end of the foot lever 53 the other end of the lever 53 carrying the vertical spindle 54 which supports the horn 1. The action of the cam 51 on the runner 50 turns the cranked lever 48 on its fulcrum stud 55 drawing up the vertical rod 47 and link 46 so that the tappet 45 of the link 46 will force the block 44 tightly against the strap 39 and the latter is held between the block 44 and the pulley 40. The upward movement of the vertical rod then raises the arm or fork 41 on its stud 42 and the strap 39 and link 52 pull up the end 56 of the lever 53 and consequently the other end of such lever 53 is depressed and the vertical spindle 54 and the horn 1 are slightly lowered to permit of the "feed" or movement of the boot or shoe under operation. When the concentric side of the cam 51 is opposite the runner 50 and consequently not acting on the latter the parts 41, 45, 46, 47 and 48, resume their normal positions by coming in contact with the stop pin 49 fixed in the frame of the machine and the spiral spring 57 on the vertical spindle 54 raises the horn 1 into position for the nail sprig or pricker to enter the sole of the boot or shoe on the horn.

The spring 38 is for the purpose of maintaining even tension on the strap 39 and taking up the slack.

For the purpose of locking the horn 1 in the raised position, I employ the wedges or blocks 58 (Figs. 2, 16 and 17) which are received in key beds or slots formed in the sockets 59 which carry the vertical spindle 54 of the horn 1. The blocks or wedges 58 are by the toggle levers 60 connected with the toggle link 61 on the end of the lever 62 (Fig. 35) which has a slight rocking motion imparted to it by means of the vertical rod 63 the friction roller 64 (Fig. 4) of which is operated by the cam 65 on the main shaft 7. The vertical rod and cam, give the downward motion and the spiral spring 66 the return or up motion the lever 62 rocking on its axis 67. The quick action of the spring 66 shoots the wedges 58 into the beds in the sockets 59 and so locks the vertical spindle 54 in the raised position while the pricker 2 or a nail or slug is being inserted into the hole the lever 62 being so controlled by the cam 65 and spring 66 that they turn or straighten the toggle link 61 only when the horn 1 is in the raised position and consequently the wedges or blocks 58 are then only forced into the sockets 59 and wedge and hold the horn spindle 54 firmly in the raised position. The wedges or blocks 58 are withdrawn by the toggle 61 and connections and cam 65 before the horn 1 is to be lowered.

By means of the apparatus described for locking the rod 54 and horn 1 in the raised position the powerful spiral spring usually applied to the spindle 54 is dispensed with and a light spring 57 sufficiently strong to raise the horn 1 and boot or shoe thereon is employed and the boot or shoe being gently raised into position, the sole of the same is not marked by coming into contact with the feet of the shear box as heretofore. A hand lever 68 and disk 69 in which is an eccentric pin 70 are employed for controlling or operating by hand the lever 62 and toggle 61 when desired or necessary and without moving the vertical rod 63 and when the blocks or wedges 58 are withdrawn from the sockets 59—59 the rod 54 and horn 1 can be depressed by the treadle 72 to permit of a boot or shoe being placed on the horn.

The main shaft 7 is driven by means of the pulley 73 (both 73 and 74 being loose on such shaft 7) and the long collar or boss 75 fast on the shaft 7 and in the collar or boss 75 is a sliding key or locking device 76 which is pressed into one of a number of holding notches or recesses 77 in the boss of the pulley 73 by means of the blade spring 78. When the sliding key 76 is in one of the recesses or notches 77 the pulley 73 is fast on the shaft 7 but the sliding key can immediately be withdrawn by the lever 79 in which is the slot 80 for receiving the pin 81 of the said sliding key 76 (such pin moving in a slot $75^A$ in the boss 75) so that when the lever 79 is moved in the direction of the arrow (Fig. 4) by means of the inclined or cam lever 82 the machine can be stopped at once. The object of the driving pulley 73 being constructed so as to be loose on its axis is to enable the operator to stop the machine at the end of one cycle of its motion or at the end of any cycle. The cam lever 82 is controlled by the lever 83, connecting rod 84 and treadle 85, so that when the latter is depressed the inclined cam lever is moved clear of the lever 79 and the locking device 76 locks the pulley 73 on the shaft 7 and the machine is driven until pressure is removed from the treadle 85 whereupon the machine is stopped at once. An adjustable guide 86 (see Figs. 4, 5 and 29) is employed on the head of the machine for the edge of the sole under operation to rest against, such guide or fence 86 determining the distance of the line of nails from the edge of the sole and each succeeding line of nails from the last line. The guide 86 consists of a beveled disk loosely carried by the pin 89 to which is attached a dovetailed piece $89^a$. This piece slides in a correspondingly shaped slot in a bracket 87 fixed on the under side of the head of the machine. Between the guide 86 and the part 87 is placed a spacing ring $86^a$ and beneath the guide 86 is a nut for securing the guide in place. Between the guide 86 and the ring $86^a$ may be placed a slotted guide plate as shown in Figs. 30 and 31 to form a further guide and prevent the sole leaving the runner.

I would here observe that I am aware that it is not new to insert a pricker into the sole and cause the pricker to move the sole laterally and I make no general claim thereto.

What I claim is—

1. In a boot nailing machine and in combination, a fixed shear box 20, shear block 22, stud 23, and stud disk 26 operating the block 24, shaft 27, lever 28, and friction roller 29 for operating the disk and so sliding the shear block, nail carrier 31, piece 34, connected thereto, bar 35 and cranked lever 26 having friction roller 36ª for sliding the nail carrier, and a cam having separate grooves for engaging with the friction rollers 29 and 36ª, and means for operating the cam, substantially as described.

2. In a boot nailing machine and in combination, a vertical slide piece 4, a horizontal slide piece 8 adapted to move in the piece 4, a friction roller 5ª, and a pricker carried by said piece 8, a supplementary slide piece 10 for operating on the piece 8, pin 9 on piece 10, slotted lever 11, and means for operating the latter, a fixed block 13, adapted to be struck by the friction roller 5ª, means for reciprocating the plate 4, and means for retracting the piece 8, substantially as described.

3. In a boot nailing machine and in combination, the horn 1, horn spindle, a light spring for raising the latter, wedges, for securing same in position, means for holding the spindle, toggle levers for inserting and withdrawing the wedges, means for operating said toggle levers, means for lowering the spindle, and means for pricking and pegging the sole on said horn, substantially as described.

4. In a boot nailing machine and in combination, the horn 1, horn spindle 54, spring 57, sockets 59, wedges 58, toggle levers 60, link 61, pivoted lever 62 connected to same, means for rocking the lever to operate the wedges through the toggle levers, and a treadle connected to the spindle for depressing the latter, substantially as described.

5. In a machine of the character described, the combination of the pivoted lever 62, toggle link, toggle levers, wedges, and horn spindle, rod 63 connected to lever 62, the main shaft, a cam on same for operating the rod, and a spring 66 connected to lever 62.

6. In a machine of the character described the combination of the pivoted lever 62, toggle links, toggle levers, wedges and horn spindle, the hand lever 68, disk 69, eccentric pin 70 for bearing on lever 62, and spring 66 for operating the wedges by hand, substantially as described.

7. In a boot nailing machine, and in combination, the horn spindle 54, a foot lever connected thereto at one end, a rod connected to the other end, a strap and weight or its equivalent connected to the rod, a pulley over which the strap passes, means for holding the strap fixed on the pulley, and means for raising the latter so that the horn spindle may be lowered to permit of the feed or movement of the boot, substantially as described.

8. In a boot nailing machine, and in combination, the horn spindle 54, a foot lever connected thereto, at one end, a rod 52 connected to the other end, a strap 39, and spring 38, or its equivalent, connected to the rod, a pulley over which the strap passes, a pivoted arm or fork 41 in which the pulley is mounted, a link 46 pivoted on the arm or fork, means operated by the link for jamming the strap onto the pulley, a rod 47 attached to the link, a cranked lever 48 attached to the rod the main shaft and a cam on same for operating the lever 48 to lift the pulley, and so lower the horn spindle, substantially as described.

In testimony whereof I have hereunto set my hand in the presence of two subscribing witnesses.

RICHARD WILKINSON BATEMAN.

Witnesses:
J. BRIERLEY HOWARD,
CHARLES AINLEY.